3,523,220
ELECTROLYTIC CAPACITOR AND PROCESS FOR PREPARING THE CONTAINER
Richard P. Harding, North Adams, Mass., assignor to Sprague Electric Company, North Adams, Mass., a corporation of Massachusetts
Filed Mar. 8, 1968, Ser. No. 711,545
Int. Cl. H01g *9/08*
U.S. Cl. 317—230       11 Claims

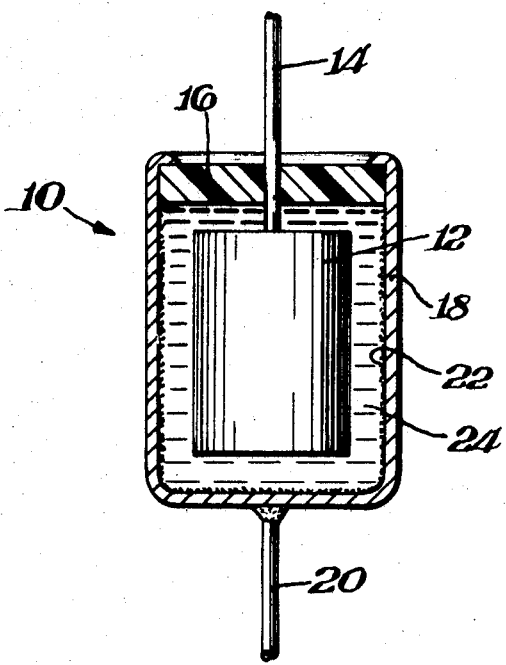

ABSTRACT OF THE DISCLOSURE

An electrolytic capacitor having an anodized valve metal anode and an electrolyte sealed within a metal container, said container having an inner surface of etched silver, said etched inner surface of said container having thereon a film of deposited silver and a member of the class consisting of the platinum group metals and gold; and a process for forming the same.

BACKGROUND OF THE INVENTION

This invention relates to an electrolytic capacitor and more particularly to a capacitor having a cathode with a deposited film of silver and at least one noble metal; and a process for forming the same.

It has been found that the variation in capacitance over a period of time and the development of a high series resistance value in prior art electrolytic capacitors is due to the appearance of a film which forms upon the inside surface of the cathode can. When employing a silver can with a sulfuric acid electrolyte, this film is believed to contain chiefly $Ag_2S$ formed by the reaction between the silver and the electrolyte. As this film forms it becomes the dielectric of a capacitor which is in series with the capacitance of the anode. The cathode capacitance thus produced is inadequate to support the anode capacitance and therefore it greatly reduces the effective capacitance of the entire capacitor. Furthermore since this dielectric film is at the metal electrolyte interface it introduces an added component of resistance to that exhibited by the electrolyte. This problem has been successfully overcome by etching the inside surface of the can and by the deposition of a noble metal such platinum black on the inside surface of the silver cathode can. In addition to being comparatively nonreactive with the electrolyte, the platinum black produces a considerably larger cathode surface than that of the opposing anode.

A prior art method of preparing such a cathode involves, nitric acid etching the silver can in one step and, after rinsing the can acid free, electrodepositing the spongy noble metal, e.g. platinum, as a second step. This technique requires considerable handling and because of the amount of handling and the cost of the noble metal, it is an expensive process. The process can also be criticized because it does not lend itself to automation mainly due to the corrosiveness of the material employed as well as the violence of the initial acid etch. It would be a considerable advance in the art if the amount of cathode handling could be reduced and if less noble metal could be employed without sacrificing the quality of the completed units.

It is an object of the invention to simplify the manufacture of valve metal electrolytic capacitors.

Another object of the invention is to reduce the cost of manufacture of valve metal electrolytic capacitors.

Still another object of the invention is to present a novel electrolytic capacitor.

Further objects and advantages of this invention will be apparent from the following description and drawing.

SUMMARY OF THE INVENTION

The above objects are obtained in accordance with the present invention by electrolyzing a plating solution containing silver ions and at least one member of the class consisting of the platinum group ions and gold ions so as to codeposit silver and the metal corresponding to said at least one member on the etched silver surface of a metal container containing said solution. Removing the residual plating solution and inserting an electrolyte and an anodized valve metal anode into said container.

In a preferred embodiment the silver ions are obtained by etching the silver surface on the inside of a metal container with an etch solution containing ferric ions, said solution also containing at least one member of the class consisting of the platinum group ions and gold ions and wherein the residual etch solution is the plating solution from which silver and the platinum group metal or gold will be plated.

In a narrower embodiment the metal container is silver, the ferric ions are derived from a member of the group consisting of ferric nitrate and ferric sulfate; the platinum group ions and gold ions are derived from chloroplatinic acid ($H_2PtCl_6 \cdot 6H_2O$, the platinum chloride of commerce), palladium nitrate or gold chloride ($AuCl_3$); and the anode is anodized tantalum and the electrolyte is sulfuric acid.

The electrolytic capacitor of the present invention comprises an anodized valve metal anode and an electrolyte sealed within a metal container, said container having an inner surface of etched silver, the etched inner surface of said container having a codeposited spongy, porous film of silver and at least one member of the class consisting of the platinum group metals and gold.

BRIEF DESCRIPTION OF THE DRAWING

The drawing illustrates a capacitor 10 having an anodized porous valve metal anode pellet 12, a valve metal riser wire 14 extends from the anode pellet and passes through a sealing gasket 16 which gasket closes the end of cathode container 18. A cathode lead 20 is attached to the cathode container. A porous metal film of codeposited silver and at least one noble metal is intimately bonded to the inside of cathode container 18. Between the cathode and the anode is an electrolyte 24. As employed herein the term noble metal includes the platinum group metals and gold but does not include silver.

DETAILED DESCRIPTION OF THE INVENTION

Example I

A series of 12 silver cans approximately ⅜ inch in diameter and ¾ inch long were filled from ⅔ to ¾ full with a combination etchant-plating solution within the scope of the present invention. This consisted of an aqueous 1 molar solution of ferric nitrate containing 1.0 gm./liter of chloroplatinic acid. At ambient temperature (about 72° F.) the solution was permitted to etch the walls of the cans for about 4 or 5 minutes. After this length of time an exceedingly fine etch structure was obtained. It will be understood that by virtue of the etching process silver ions were introduced into the system. Immediately thereafter a platinum black-coated platinum wire electrode was inserted into the solution and, with the silver cans as the negative electrodes, the units were subjected to electrolysis with a current of about 100–200 milliamperes per can for about 60 seconds. A film of silver and platinum was codeposited on the walls of the cans by this action. The cans were then rinsed and dried.

Previously prepared anodized tantalum pellets rated so that the final capacitor would provide 390µf. at 10 volts were inserted into the cans along with a 40%

$H_2SO_4$ electrolyte. The units were then sealed with a conventional seal such as that illustrated in the drawing.

Example II

By way of comparison, the same number of units of the same size were prepared employing a standard $HNO_3:H_2O$ etchant. The cathode cans were etched to as near as possible the same degree as the cans of Example I. The cans were rinsed acid free and a chloroplatinic acid platinizing solution having a concentration of about 10 times the concentration of the chloroplatinic acid of the preceding example was added to each can. Platinum black-coated platinum wire anodes were employed as in the previous example. Platinum deposition was obtained by utilizing 40 milliamperes per can for a period of 180 seconds. The capacitors were completed as above. These units are representative of a commercially available capacitor.

It will be noted that the plating conditions (current density) were different in the preceding examples. It has been experimentally determined that the plating conditions employed in Example I produce a cathode capacitance equivalent to the cathode capacitance of Example II with an obvious considerable time savings.

The capacitors of both examples were subjected to routine, standard tests, e.g. capacitance, RxC and leakage, before and after life test and shelf test. The units of Example I proved to be at least equivalent in all respects to those of Example II.

An analysis of a representative cathode container prepared in accordance with the process of Example I revealed that the codeposited metal film on the surface of the etched silver contained about 0.7% platinum and about 99.3% silver.

In another embodiment of the present invention 1 molar ferric nitrate containing 0.45 gm./liter of palladium nitrate was employed as the combination etchant-plating solution in the process. Units prepared with this solution in accordance with the process of Example I were as good or better than the units of Example II.

In the present invention it is theorized that during the etching process, the etchant-plating solution, for example, ferric nitrate and the soluble noble metal salt, is allowed to react chemically with the silver container. During this operation, the ferric ion is reduced to the ferrous state and silver metal from the container is oxidized (etched) to an ionic state and it enters into solution. No gaseous by-products are produced. It has been determined that an optimum percentage of deposited noble metal need only be about 0.01 to 30 percent of the codeposited silver. Within this range from 0.1–15 percent of the silver is preferred. It is theorized that this comparatively small amount of noble metal effects extremely low resistance paths between the silver can wall and the electrolyte. These low-resistance paths constitute a plurality of direct shorts which negate the low capacitance caused by the formed silver sulfide film.

Employing the process of the present invention not only yields the advantage of being a simpler technique but compared with the commercial process, which deposits about 100 percent platinum or palladium, a savings of approximately 70 to 99 plus percent noble metal is gained.

Among the water soluble platinum group metal salts contemplated, in addition to chloroplatinic acid and pallamium nitrate, the following may be employed: rhodium sulfate $Rh_2(SO_4)_3 \cdot 4H_2O$, (also $Rh_2(SO_4)_3$ with 12 or 15 molecules of $H_2O$), ruthenium oxide $RuO_4$, iridium sulfate $Ir_2(SO_4)_3 \cdot xH_2O$ and osmium oxide $OsO_4$.

The concentration of the etchant-plating solution of the present invention can be such that it contains 0.1–10 molar ferric ion containing, as an upper limit, a concentration of noble metal ion equal to a concentration which will yield about 30% deposited noble metal ranging down to a lower limit of a concentration which will yield about 0.01% deposited noble metal based upon the weight of deposited silver. The current density range contemplated herein for the codeposition of silver and the noble metal is from 2–250 milliamperes per $cm.^2$ for from 10 minutes to 10 seconds, preferably from 10–100 milliamperes per $cm.^2$ for five minutes to 30 seconds. When employing an etching-plating solution having a concentration of 1 molar ferric ion, the etching time can range from about 1 minute to about 24 hours.

It is to be understood that the process of the present invention can be carried out with the plating anode present in the solution during the etching step rather than being inserted at the completion of the etching step as shown in Example I.

As used herein the term "codeposit" is intended to cover actual simultaneous deposition of the silver and the noble metal or a rapid sequential deposition of the metals or whatever other depositing mechanism may inherently take place during the plating step of the present invention. Since there is no intention of being bound by a theory of reaction, it is believed prudent to broadly define the term "codeposit" in the manner indicated.

The anodes contemplated herein are the valve metals such as tantalum, niobium, aluminum, zirconium, etc. These anodes can be etched or unetched foil, wire, plate, or it may be a porous sintered pellet. The dielectric film formed on the anode may be obtained by the use of any acceptable prior art electrolyte such as boric acid, borate, phosphoric acid, etc. The working electrolyte of the capacitors of the present invention may be any of the prior art working electrolytes suited to the particular valve metal capacitor used, for example, sulfuric acid, lithium chloride, ammonium pentaborate, etc. The cathode contemplated in the present invention can be of any metal so long as the interior surface is silver prior to treatment according to the method of the present invention. Thus it may be a silver can or a can having a silver interior. When the can is not all silver, it may be a container of one of the base metals (steel, Cu, etc.) having an interior silver surface which is either clad silver or silver plate. As employed herein the term platinum group metals is used in its conventional sense which includes the six metals of this group. The combined etchant-plating solution should contain the selected platinum group metal in the form of its water soluble salt or complex. The ferric ion is derived from a water soluble salt of iron. Some preferred forms of this material are: an aqueous solution of ferric nitrate, and an aqueous solution of ferric sulfate with or without sulfuric acid being present.

The codeposited film of silver and noble metal can be described as a spongy liquid-permeable silver layer containing a minority of deposits of the noble metal.

Since it is obvious that many changes and modifications can be made in the above-described details without departing from the nature and spirit of the invention it is to be understood that the invention is not limited to said details except as set forth in the appended claims.

What is claimed is:

1. The method of preparing an inner silver surface of a metal container for an electrolytic capacitor comprising contacting said inner surface with a plating solution containing silver ions and at least one member of the class consisting of the platinum group ions and gold ions and applying a potential between said surface and solution to codeposit silver and the metal of said at least one member on the silver surface of said metal container.

2. The method of claim 1 further comprising the preliminary step of etching the silver surface on the inside of said metal container with an etch solution containing ferric ions and said at least one member of the class consisting of the platinum group ions and gold ions, thereby providing said silver ions of said plating solution and wherein the residual etch solution also constitutes said plating solution.

3. The method of claim 2 including removing the residual plating solution and inserting an electrolyte and an anodized valve metal anode into said container.

4. The method of claim 3 wherein the metal container is all silver; the ferric ions are derived from a member of the group consisting of ferric nitrate and ferric sulfate; the platinum group ions and gold ions are derived from a member of the group consisting of chlorophatinic acid, palladium nitrate, rhodium sulfate, ruthenium tetroxide, osmium tetroxide, iridium sulfate and gold (ic) chloride; the electrolysis is effected by a current of from 2–250 milliamperes/cm.$^2$ for a period of from 10 minutes to 10 seconds; the electrolyte is a sulfuric acid electrolyte; and the valve metal is tantalum.

5. The method of claim 4 wherein the ferric ions are derived from ferric nitrate, the platinum group ions are palladium ions and electrolysis is effected by a current of 10–100 milliamperes/cm.$^2$ for a period of 5 minutes to 30 seconds.

6. The method of claim 4 wherein the ferric ions are derived from ferric nitrate, the platinum group ions are platinum ions and electrolysis is effected by a current of 10–100 milliamperes/cm.$^2$ for a period of 5 minutes to 30 seconds.

7. The method of claim 4 wherein the ferric ions are derived from ferric sulfate, the platinum group ions are palladium ions and electrolysis is effected by a current of 10–100 milliamperes/cm.$^2$ for a period of 5 minutes to 30 seconds.

8. The method of claim 4 wherein the ferric ions are derived from ferric sulfate, the platinum group ions are platinum ions and electrolysis is effected by a current of 10–100 milliamperes/cm.$^2$ for a period of 5 minutes to 30 seconds.

9. An electrolytic capacitor comprising an anodized valve metal anode and an electrolyte sealed within a metal container, said container having an inner surface of etched silver, said etched inner surface having thereon a codeposited spongy, porous film of silver and at least one member of the class consisting of the patinum group metals and gold.

10. The capacitor of claim 9 wherein the valve metal is tantalum, the electrolyte is a sulfuric acid solution, the metal container is silver and the codeposited film contains about 70–99.99% silver and about 0.01–30% of said member of the class consisting of the platinum group metals and gold.

11. The capacitor of claim 10 wherein the codeposited film contains about 85–99.9% silver and about 0.1–15% of said member of the class consisting of the platinum group metals and gold.

References Cited

UNITED STATES PATENTS

| | | | |
|---|---|---|---|
| 3,082,360 | 3/1963 | Robinson et al. | 317—230 |
| 3,255,388 | 6/1966 | Sparing | 317—230 |

JAMES D. KALLAM, Primary Examiner

U.S. Cl. X.R.

29—570